United States Patent [19]

Uman et al.

[11] 4,276,576

[45] Jun. 30, 1981

[54] LIGHTNING ACTIVATED RELAY

[75] Inventors: Martin A. Uman; Ronald B. Standler, both of Gainesville, Fla.

[73] Assignee: Lightning Location and Protection, Inc., Tucson, Ariz.

[21] Appl. No.: 973,764

[22] Filed: Dec. 27, 1978

[51] Int. Cl.³ .............................................. H02H 1/04
[52] U.S. Cl. ....................................... 361/1; 340/601; 361/120
[58] Field of Search .................... 361/1, 111, 119, 120; 324/72; 340/601

[56] References Cited

U.S. PATENT DOCUMENTS

| 2,265,868 | 12/1941 | Schonland | 361/120 X |
| 3,753,117 | 8/1973 | Downing et al. | 340/601 X |

OTHER PUBLICATIONS

"Building a Sferics Counter With Two Ics"–SAJA et al., Electronic Engineering 2/1977, p. 23.
"The Return Stroke of the Lightning Flash to Earth as a Source of VLF Atmospherics"–Dennis et al., Radio Science Journal of Research NBS/USNC-URSI, vol. 68D, No. 7, Jul. 1964.
"Leader and Junction Processes in the Lightning Discharge as a Source of VLF Atmospherics"–Arnold et al., Radio Science Journal of Research NBS/USNC-URSI, vol. 68D, No. 7, Jul. 1964.
"Amplitude and Phase Curves for Ground-Wave Propagation in the Band 200 Cycles Per Second to 500 Kilocycles" James R. Wait et al., U.S. Government Printing Office 1956.

Primary Examiner—Harry E. Moose, Jr.
Attorney, Agent, or Firm—Mason, Kolehmainen, Rathburn & Wyss

[57] ABSTRACT

A lightning activated relay utilizes an electric or magnetic field responsive detector for determining the presence of atmospheric conditions potentially capable of producing lightning or for detecting the occurrence of lightning within a predetermined range. Switching circuitry responsive to the detector is provided for isolating electrical equipment from the electric power mains and isolating or grounding communications or other equipment susceptible to lightning damage when such conditions are detected or upon the occurrence of a temporary power interruption.

33 Claims, 1 Drawing Figure

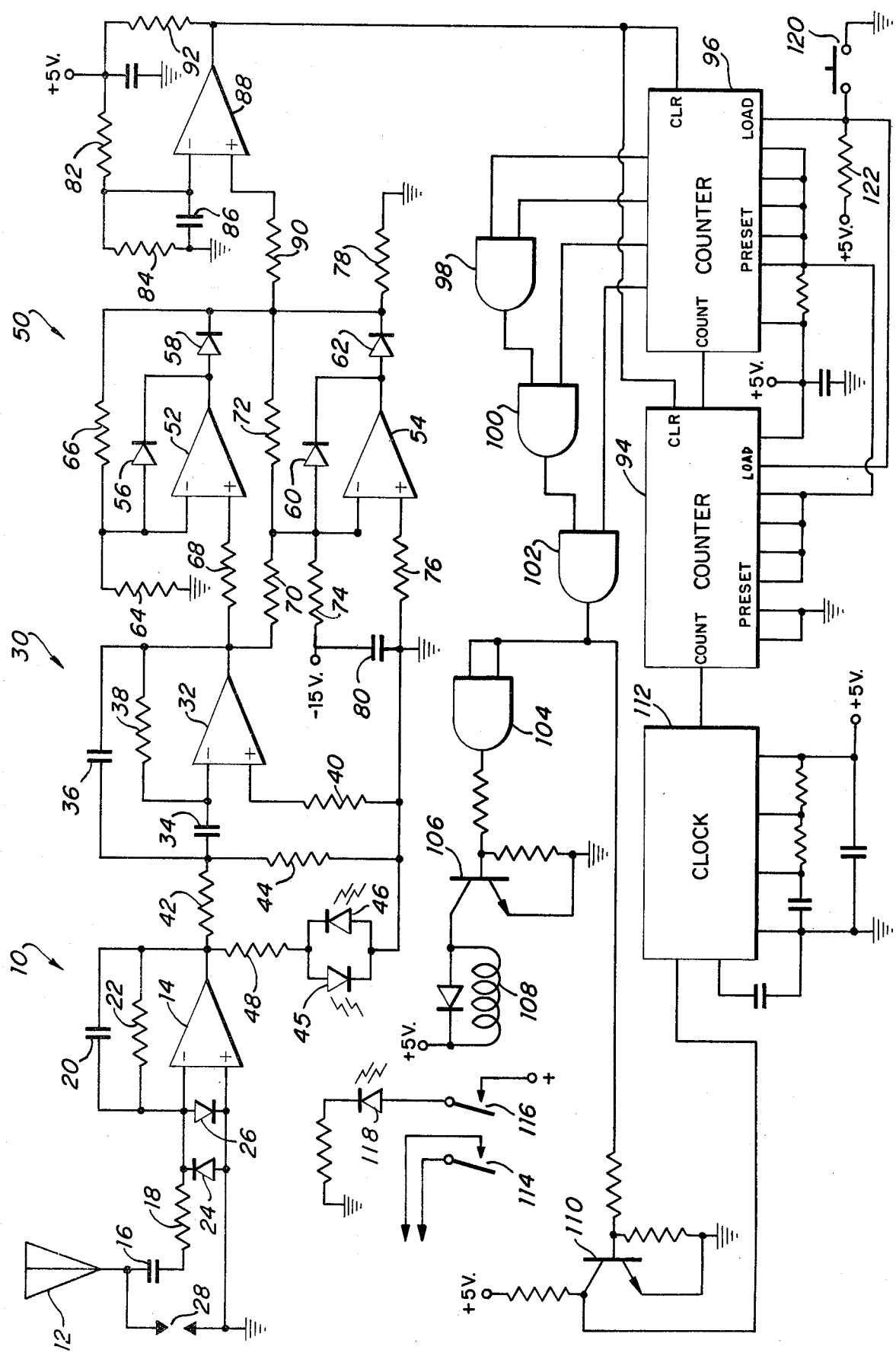

LIGHTNING ACTIVATED RELAY

BACKGROUND OF THE INVENTION

1. Field of the Invention

This invention relates generally to lightning protection devices, and more particularly, to devices for protecting electrical equipment by grounding, isolating from the electrical power mains or otherwise protecting the equipment when atmospheric conditions are such that lightning is likely to occur or has occurred within a predetermined range.

2. Description of the Prior Art

Lightning protection systems are known. Such systems generally employ a lightning rod or the like for drawing the lightning harmlessly to itself and arresters that employ spark gaps or other devices for conducting the current produced by a lightning stroke to ground.

While such devices provide a degree of lightning protection, particularly when used on relatively high objects, such as buildings or power line towers, there exists a need to protect electrical equipment, such as, for example, irrigation pumps, cooling pond temperature sensors and other electrical equipment, from damage caused by lightning striking either on or near the mains or the equipment itself.

SUMMARY OF THE INVENTION

Accordingly, it is an object of the present invention to provide a lightning protection system that is suitable for protecting electrical apparatus from damage caused by lightning discharges.

In accordance with a preferred embodiment of the invention, a lightning activated relay is interposed between the electrical equipment being protected and the power mains from which the equipment is being energized. Depending on the type of equipment being protected, protection may also be achieved by isolating the protected equipment from other apparatus such as antennas, by grounding the equipment, or by a combination of isolation and grounding. The lightning activated relay includes a detector which may be responsive either to the electric field produced by charged clouds, or to the electric or magnetic field produced by a lightning discharge. The detector is operatively coupled to filtering circuitry and switching circuitry that isolates the equipment being protected from the power lines or other apparatus, or grounds the equipment when atmospheric conditions are suitable for the occurrence of a lightning stroke, or when a distant lightning stroke has occurred. A timer is provided for maintaining the equipment isolated or grounded for a predetermined time, usually 20 minutes but which may be varied, following the occurrence of each detected lightning stroke or danger condition. Since alternating current power interruptions are usually associated with lightning storms, the system is also provided with a sensor that is responsive to power interruptions for isolating or grounding the protected equipment upon the occurrence of a temporary power interruption.

BRIEF DESCRIPTION OF THE DRAWING

These and other objects and advantages of the present invention will become readily apparent upon consideration of the following detailed description and accompanying drawing, wherein:

The single FIGURE is a schematic diagram of the lightning activated relay according to the invention.

DETAILED DESCRIPTION OF THE PREFERRED EMBODIMENT

Referring now to the drawing, there is shown a detector circuit generally designated by the reference numeral 10 electrically coupled to an antenna 12. The detector circuit 10 contains an operational amplifier 14 which has a high impedance field effect transistor input stage and an output voltage that is proportional to the time integral of the current flowing from the antenna 12 through a capacitor 16, a resistor 18 and ground. The integration time of the amplifier is determined by the time constant provided by a capacitor 20 and a resistor 22, and in the present embodiment, the integration time is approximately one millisecond. Thus, since the antenna current is proportional to the time rate of change of the local electric field, the output of the amplifier 14 is proportional to the electric field change during the preceding millisecond. A pair of diodes 24 and 26, as well as a spark gap 28, serve to protect the input of the amplifier 14 from damage caused by nearby lightning strokes.

The output of the detector 10 is coupled to a bandpass filter generally designated by the reference numeral 30. The bandpass filter utilizes a second operational amplifier 32, a pair of capacitors 34 and 36 and four resistors 38, 40, 42 and 44 to provide a center frequency of about 6 kHz and a quality factor (Q) of approximately 10. Thus, the filter serves to filter out power line and other extraneous frequencies and accept signals generated by the first return stroke of a lightning discharge. The bandpass filter 30 is directly coupled to the detector 10, and a pair of light emitting diodes 45 and 46 are coupled to the output of the amplifier 14 via a resistor 48. The purpose of the diodes 45 and 46 is to indicate a fault in the system, such as a failure of the detector, when the diodes are continuously lighted. The diodes will also flash intermittently during detected lightning discharges, and light whenever the antenna goes into corona discharge. Corona discharge indicates electrical fields on the order of several thousand volts per meter, thus indicating the presence of highly charged clouds in the vicinity.

The output of the bandpass filter 30 is coupled to an absolute value and offset circuit generally designated by the reference numeral 50. The absolute value and offset circuit comprises a pair of operational amplifiers 52 and 54 and associated components including diodes 56, 58, 60 and 62, as well as resistors 64, 66, 68, 70, 72, 74, 76, 78 and a capacitor 80. The absolute value and offset circuit 50 receives the signal from the bandpass filter 30 and converts negative input signals to positive output signals and adds a slight offset voltage to the output signal. The inverted and offset signal is then compared with the voltage present at the junction of a pair of resistors 82 and 84 and a capacitor 86 by means of a comparator 88. The signal from the absolute value and offset circuit 50 is applied to the comparator 88 by means of a coupling resistor 90. A resistor 92 serves as a pull-up resistor for the comparator 88.

The output of the comparator 88 is coupled to the CLEAR input of a pair of counters 94 and 96 whose count outputs are coupled to three AND gates 98, 100 and 102, with the gate 102 driving a relay driver 104 which operates a transistor 106. The transistor 106 energizes a relay coil 108 when the count in the counter 96 reaches a predetermined level, i.e., when the four outputs of the counter 96 are high. The output of the AND gate 102 is also coupled to a transistor 110 which controls the operation of a clock 112. The transistor 110 causes the clock 112 to apply pulses to the count input of the counter 94 after lightning has been detected.

In operation, the system is responsive to rapid atmospheric electric field (or magnetic field when a magnetic field antenna is used) changes which are commonly produced by lightning strokes within a predetermined range, for example, 20 kilometers. The field is detected by the antenna 12, which produces a signal that is amplified by the amplifier 14, filtered by the bandpass filter 30 and partially inverted and offset by the absolute value and offset circuit 50. Alternatively, the system can be made responsive to corona discharge at the antenna, indicative of a large static electric field typically on the order of more than two kilovolts per meter, by eliminating or bypassing the capacitor 16 and the bandpass filter 30. If the magnitude of the detected signal is sufficient to provide a signal at the output of the absolute value and offset circuit 50 that exceeds the voltage at the junction of the resistors 82 and 84, the output of the comparator 88 clears the counters 94 and 96. This causes the outputs of the counter 96 to go low, which in turn causes the outputs of the gates 98, 100, 102 and 104 to go low, and renders the transistor 106 nonconductive. Rendering the transistor 106 nonconductive deenergizes the relay coil 108 and opens a pair of relay contacts 114 and 116. The opening of the contacts 114 disconnects the electrical equipment being protected (not shown) from the power mains, and the opening of the contacts 116 disconnects power from a green light emitting diode 118. The function of the green light emitting diode 118 is to indicate an all-clear when no lightning is present. Similarly, the red light emitting diodes 45 and 46 are energized when the output of the amplifier 14 exceeds a predetermined level of approximately 2 volts. Continuous energization of the diodes 45 and 46 generally indicates a fault in the system, and an intermittent energization indicates the detection of lightning. Although only a single set of relay contacts 114 is illustrated for purposes of clarity, it should be understood that as many sets of contacts as required to protect the equipment are to be utilized. Generally, a separate set of contacts is provided for each wire connecting the protected equipment to the mains. Also, double-throw contacts may be utilized if it is desired to ground the equipment, or to turn on equipment such as an alarm or lightning location circuitry. Also, the contacts 114 may be used to control a second relay which is used to disconnect the protected equipment from the mains or other circuits, to ground the equipment, or to provide any desired function.

After the protected equipment has been isolated or grounded, the equipment is maintained isolated or grounded for a predetermined length of time, for example, approximately 20 minutes, following the occurrence of each detected lightning stroke or power interruption. The timing function is provided by the control transistor 110, the clock 112 and the counters 94 and 96 which are cleared each time a lightning stroke or power interruption is detected. When the equipment being protected is isolated or grounded by a clearing of the counters 94 and 96, the output of the gate 102 goes to a low state, thereby rendering the transistor 110 nonconductive. The rendering of the transistor 110 nonconductive causes the collector of the transistor 110 to go to a high state, thereby initiating the operation of the clock 112. The output of the clock 112, which in the present embodiment is a square wave having a frequency of approximately 110 Hz, is applied to the counter 94. The counter 94 is coupled to the counter 96 in order to form a composite counter, with the most significant bits of the composite counter being the four outputs of the counter 96.

The square wave from the clock 112 is counted by the counters 94 and 96 until the most significant bits of the composite counters 94 and 96, that is the four outputs of the counter 96, reach a high state. When this occurs, the outputs of the AND gates 98, 100, 102 and 104 also reach a high state. The high state at the output of the AND gate 104 renders the transistor 106 conductive and energizes the relay coil 108 in order to reconnect the equipment being protected to the power mains. As previously stated, the frequency of the square wave signal produced by the clock 112 and the counter count necessary to reenergize the relay coil 108 have been selected to maintain the equipment deenergized for a period of approximately 20 minutes. However, the isolation time interval may readily be changed by, for example changing the frequency of the clock 112 or by altering the connections on the counters 94 and 96.

Because alternating current power sometimes fails momentarily during a thunderstorm, the system contains circuitry responsive to a momentary power failure for declaring a lightning danger state and isolating the equipment being protected from the power mains during such a momentary power failure and for a predetermined time thereafter. This is accomplished by the resistance-capacitance network comprising the resistors 74, 82 and 84, and the capacitors 80 and 86 coupled to the inverting output of the amplifier 54 and comparator 88.

During steady state operation, the resistor 74 provides a slightly positive offset voltage at the output of the amplifier 54. However, during a temporary power interruption, the capacitor 86 is discharged and slowly recharged after the alternating current power is restored. During the initial charging of the capacitor 86, the offset voltage applied to the inverting input of the comparator 88 is reduced. The reduced voltage causes the output of the amplifier 54 to exceed the reference level at the junction of the resistors 82 and 84, and causes the comparator 88 to clear the counters 94 and 96 in the same manner as would the detection of a lightning discharge by the detector circuit 10.

In the event that power interruption was not caused by lightning, or upon a false triggering of the system by various atmospheric conditions, the protected equipment can be reconnected to the power line by depressing a switch 120. The switch 120 grounds a resistor 122 connected to the load inputs of the counters 94 and 96, and causes the preset inputs to be loaded into the counters 94 and 96. This raises the four outputs of the counter 96 to a high logic level and causes the relay coil 108 to be reenergized.

The detection circuit described in the foregoing is relatively simple and has been found to be quite effective. However, if further sophistication is required, including, for example, circuitry capable of distinguishing between intercloud strokes and ground strokes, a lightning detection system such as the system disclosed in U.S. Pat. No. 4,115,732, incorporated herein by reference, may be used to activate the disconnecting circuitry.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A lightning protection system usable for protecting equipment operated from an electrical power source upon the occurrence of atmospheric conditions likely to produce lightning comprising:
    means for detecting the field produced by electrical storms;
    switching means having a first condition of operation wherein said equipment is in an operational condition and a second condition of operation wherein said equipment is in a protected condition, said switching means being responsive to said detecting means for placing said electrical equipment in said protected condition upon the detection of said field; and
    means operatively coupled to said electrical power source and to said switching means for rendering said switching means operative to place said electrical equipment into said protected condition upon the occurrence of an interruption in the power provided by said electrical power source.

2. A lightning protection system as recited in claim 1 further including timing means operatively coupled to said switching means for altering the condition of operation of said switching means from said second condition of operation to said first condition of operation after the passage of a predetermined time interval following the occurrence of said atmospheric condition.

3. A lightning protection system as recited in claim 2 wherein said predetermined time interval is on the order of approximately 20 minutes.

4. A lightning protection system as recited in claim 1 wherein said power source is an alternating current power main.

5. A lightning protection system as recited in claim 4 wherein said interruption is a temporary interruption.

6. A lightning protection system as recited in claim 1 wherein said field is an electric field.

7. A lightning protection system as recited in claim 6 wherein said electric field is an electric field produced by a lightning discharge occurring within approximately 20 kilometers of said detecting means.

8. A method of protecting electrical equipment operated from electrical mains from damage by lightning comprising the steps of:
    detecting the field produced by an electrical storm;
    monitoring the electrical mains; and
    isolating or grounding the electrical equipment upon the detection of said field, or upon an interruption in the power provided by the electrical mains.

9. The method recited in claim 1 wherein said predetermined time interval is approximately 20 minutes.

10. The method recited in claim 1 further including the step of monitoring the electrical mains and isolating or grounding said electrical equipment for said predetermined time interval following a temporary interruption in the power provided by the electrical mains.

11. The method recited in claim 9 wherein the step of detecting the field includes the step of detecting the field produced by a lightning discharge.

12. The method recited in claim 11 wherein the step of detecting the field produced by a lightning discharge includes the step of detecting the electric field produced by the discharge.

13. A lightning protection system as recited in claim 6 wherein said electric field detecting means includes means for detecting an electric field having a frequency of approximately 6 kHz.

14. A lightning protection system as recited in claim 13 wherein said electric field detecting means includes a bandpass filter having a center frequency of approximately 6 kHz.

15. A lightning protection system as recited in claim 6 wherein said electric field detecting means includes means for detecting a static electric field.

16. A lightning protection system as recited in claim 1 wherein said field detecting means includes means for detecting a magnetic field.

17. A lightning protection system as recited in claim 16 wherein said magnetic field detecting means includes means for detecting a magnetic field having a frequency of approximately 6 kHz.

18. A lightning protection system as recited in claim 17 wherein said magnetic field detecting means includes a bandpass filter having a center frequency of approximately 6 kHz.

19. The method recited in claim 12 wherein the step of detecting the electric field includes the step of detecting the electric field having a frequency of approximately 6 kHz.

20. The method recited in claim 12 wherein the step of detecting the electric field includes the step of detecting the static electric field.

21. The method recited in claim 11 wherein the step of detecting the field produced by a lightning discharge includes the step of detecting the magnetic field produced by the discharge.

22. The method recited in claim 21 wherein the step of detecting the magnetic field includes the step of detecting the magnetic field having a frequency of approximately 6 kHz.

23. A lightning protection system usable for protecting equipment operated from an electrical power source upon the occurrence of atmospheric conditions likely to produce lightning comprising:
    means for detecting a field having a frequency of approximately 6 kHz produced by electrical storms;
    switching means having a first condition of operation wherein said equipment is in an operational condition and a second condition of operation wherein said equipment is in a protected condition, said switching means being responsive to said detecting means for placing said electrical equipment in said protected condition upon the detection of said field; and
    timing means operatively coupled to said switching means for altering the condition of operation of said switching means from said second condition of operation to said first condition of operation after the passage of a predetermined time interval of several minutes following the latest detection of said field.

24. A lightning protection system as recited in claim 23 wherein said field detecting means includes means for detecting an electric field.

25. A lightning protection system as recited in claim 24 wherein said electric field detecting means includes a bandpass filter having a center frequency of approximately 6 kHz.

26. A lightning protection system as recited in claim 23 wherein said field detecting means includes means for detecting a magnetic field.

27. A lightning protection system as recited in claim 26 wherein said magnetic field detecting means includes a bandpass filter having a center frequency of approximately 6 kHz.

28. A lightning protection system as recited in claim 23 wherein said predetermined time interval is approximately 20 minutes.

29. A lightning protection system as recited in claim 23 wherein said timing means includes a clock providing pulses at a predetermined rate, a counter operatively coupled to said counter providing a count representative of the number of pulses received from said clock, said counter being responsive to said detecting means for resetting said count to a predetermined value upon the detection of the field.

30. A method of protecting electrical equipment from damage by lightning comprising the steps of:
   detecting atmospheric conditions likely to produce lightning by detecting a field having a frequency of approximately 6 kHz produced by an electrical storm;
   isolating or grounding the electrical equipment when the detected field exceeds a predetermined level; and
   maintaining said electrical equipment isolated or grounded for a predetermined time interval of several minutes following each occurrence of said field exceeding said predetermined level.

31. The method recited in claim 30 wherein the step of detecting the field includes the step of detecting the electric field.

32. The method recited in claim 31 wherein the step of detecting the field includes the step of detecting a magnetic field.

33. The method recited in claim 30 wherein said predetermined time interval is approximately 20 minutes.

* * * * *